US012333197B2

(12) United States Patent
Yasuda et al.

(10) Patent No.: US 12,333,197 B2
(45) Date of Patent: Jun. 17, 2025

(54) ADJUSTING A VEHICLE DISPLAY THAT OCCLUDES A VIEW OF AN OPERATOR IN RESPONSE TO IDENTIFYING A RISK

(71) Applicant: Toyota Research Institute, Inc., Los Altos, CA (US)

(72) Inventors: Hiroshi Yasuda, San Francisco, CA (US); Manuel Ludwig Kuehner, Mountain View, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 645 days.

(21) Appl. No.: 17/709,672

(22) Filed: Mar. 31, 2022

(65) Prior Publication Data
US 2023/0315369 A1    Oct. 5, 2023

(51) Int. Cl.
*G06F 3/14*   (2006.01)
*B60K 35/00*  (2006.01)
*G06T 7/70*   (2017.01)
*G06V 20/58*  (2022.01)
*B60K 35/28*  (2024.01)
(Continued)

(52) U.S. Cl.
CPC ............... *G06F 3/14* (2013.01); *B60K 35/00* (2013.01); *G06T 7/70* (2017.01); *G06V 20/58* (2022.01); *B60K 35/28* (2024.01); *B60K 35/65* (2024.01); *B60K 35/81* (2024.01); *B60K 2360/172* (2024.01); *B60K 2360/741* (2024.01);
(Continued)

(58) Field of Classification Search
CPC ........... G06F 3/14; G06F 3/147; B60K 35/00; B60K 35/28; B60K 35/65; B60K 35/81; B60K 2360/172; B60K 2360/741; B60K 35/235; B60K 35/10; B60K 35/654; B60K 2360/175; B60K 2360/785; B60K 35/22; G06T 7/70; G06T 2207/30201; G06T 2207/30252; G06V 20/58; G06V 20/20; G06V 20/56; G06V 20/597; G09G 2380/10

See application file for complete search history.

(56) References Cited

U.S. PATENT DOCUMENTS 9,937,929 B2    4/2018  Wulf
10,017,114 B2   7/2018  Bongwald
(Continued)

FOREIGN PATENT DOCUMENTS

JP   2021148690 A  *  9/2021  ............ B60K 35/00
WO  2018056981 A1    3/2018
WO  2019068412 A1    4/2019

*Primary Examiner* — Shon G Foley
(74) *Attorney, Agent, or Firm* — Christopher G. Darrow; Darrow Mustafa PC

(57) ABSTRACT

System, methods, and other embodiments described herein relate to adjusting a vehicle display that occludes a view of an operator in response to identifying a risk. In one embodiment, a method includes, in response to determining a vehicle is operating in an autonomous mode, displaying content on at least one display within the vehicle that occludes a field-of-view (FOV) of an operator through a window of the vehicle. The method includes analyzing sensor data from at least one sensor of the vehicle to identify a risk associated with a path of the vehicle. The method includes, in response to determining the risk satisfies a risk threshold, adjusting display of the content associated with the display occluding the FOV.

20 Claims, 6 Drawing Sheets

(51) Int. Cl.
*B60K 35/65* (2024.01)
*B60K 35/81* (2024.01)

(52) U.S. Cl.
CPC .............. *G06T 2207/30201* (2013.01); *G06T 2207/30252* (2013.01)

(56) References Cited

U.S. PATENT DOCUMENTS

| | | |
|---|---|---|
| 10,059,175 B2 | 8/2018 | Cuddihy et al. |
| 10,144,348 B2 | 12/2018 | Hergeth |
| 10,603,988 B2 | 3/2020 | O'Keefe |
| 2006/0164219 A1 | 7/2006 | Knoll |
| 2018/0141414 A1 | 5/2018 | Lota |
| 2019/0324452 A1 | 10/2019 | Sato et al. |
| 2021/0318135 A1* | 10/2021 | Chandupatla ...... G01C 21/3682 |
| 2023/0017486 A1* | 1/2023 | Homma .................. G08G 1/00 |

* cited by examiner

ADJUSTING A VEHICLE DISPLAY THAT OCCLUDES A VIEW OF AN OPERATOR IN RESPONSE TO IDENTIFYING A RISK

TECHNICAL FIELD

The subject matter described herein relates, in general, to adjusting a display that occludes a field-of-view (FOV) of an operator, and, more particularly, to adjusting the display in response to identifying a risk within the FOV to at least partially remove an occlusion.

BACKGROUND

Displays associated with vehicle windows may provide content (e.g., entertainment, navigation information, notifications, etc.) to an operator while the vehicle operates in an autonomous mode because the operator does not need to focus on controlling the vehicle. For example, an operator can safely watch content on a vehicle display while the vehicle is operating autonomously because the operator does not need to see the surrounding environment of the vehicle. However, a vehicle operating in an autonomous mode may request operator takeover in response to identifying risks within the environment of a vehicle. For example, vehicle sensors may detect a risk that warrants operator takeover, such as adverse weather, congested areas of traffic, pedestrians, or the like. Consequently, if an operator cannot see the risk due to a display occluding the field-of-view (FOV) of the operator, the operator will not be prepared to take over when prompted. As such, when the operator takes manual control, the operator may panic, drive erratically, or be unable to identify the risk that prompted manual takeover, which may lead to an accident.

Further, the vehicle may encounter risks that cause the vehicle to make sudden movements (e.g., apply the brakes, change lanes, swerve, etc.). If an operator cannot see the risk that causes the vehicle to move suddenly due to an occluding display, the operator may panic, become uncomfortable, or believe that something is wrong with the vehicle. As such, displaying content on a display associated with a window of a vehicle presents unique safety considerations in relation to ensuring that an operator can see various risks within the FOV of the operator.

SUMMARY

Example systems and methods disclosed herein relate to adjusting a display associated with a vehicle window when risks are identified within the FOV of an operator. As previously discussed, sudden requests for manual takeover or sudden vehicle maneuvers taken by a vehicle when an operator's FOV is occluded by a display may result in an operator becoming panicked, driving erratically, thinking the vehicle is operating incorrectly, or the like. Because the occluding display may have undesirable effects on the operator, such displays present potentially dangerous circumstances.

In one embodiment, a system is disclosed that adjusts a display. The display is, for example, integrated with a vehicle window and, thereby, occludes an FOV of an operator. In one approach, the system displays content on the display in response to determining that the vehicle is operating autonomously. In one approach, the system analyzes sensor data from at least one sensor of the vehicle (e.g., camera, light detection and ranging (LiDAR) sensor, etc.) to identify a risk. The risk is, for example, a pedestrian, an erratic vehicle, a congested road, adverse weather, an upcoming vehicle movement, such as changes in longitudinal and lateral movements due to an upcoming lane change or to avoid hitting an obstacle, a road obstruction, a possible collision, and the like. In one configuration, the system analyzes sensor data to determine a location and trajectory of a risk (e.g., identifying a pedestrian located to the left of the operator heading in a trajectory associated with the path of the vehicle).

In response to determining the risk satisfies a risk threshold, the system adjusts display of the content associated with the occluding display. In one embodiment, a risk satisfies the risk threshold when the system determines that the risk is substantially similar to stored data associated with a risk that prompts user action. In one approach, user action is an operator observation of the surroundings of the vehicle or a manual takeover of the vehicle. For example, the system, in one embodiment, determines that pedestrians are walking in different directions within the surroundings of the vehicle. Accordingly, the presence of the pedestrians satisfies the risk threshold, in the noted example, because the presence of the pedestrians triggers a request for operator takeover of the vehicle. Accordingly, the system adjusts the display of the content occluding the FOV of the operator.

In one arrangement, the system identifies the gaze of the operator to determine the FOV of the operator. In one approach, the system determines the gaze of the operator by analyzing sensor data associated with sensors located within the vehicle (e.g., a camera) to identify head and eye positions of the operator. In particular, the system analyzes the head and eye positions of the operator to extrapolate a gaze of the operator within the FOV of the operator. The system, in one configuration, determines that a display occludes the risk from the FOV of the operator when the gaze of the operator is directed towards the display, and the risk is occluded by the display. In one arrangement, the system determines the risk is occluded by the display when known or defined areas of view for the operator are directed towards the display, and the risk is occluded by the display. As such, in one embodiment, the system adjusts the display of the content to show the risk within the FOV of the operator.

In one approach, the system adjusts the display of the content by increasing a transparency of the display relative to the FOV of the operator. In one embodiment, the system continues to display content to the operator on the display while increasing the transparency of the display to prompt operator observation of the road or operator takeover of the vehicle. Additionally, or alternatively, in one arrangement, the system adjusts the display of the content by moving the location of the content relative to the FOV of the operator. For example, if the system determines that a vehicle is approaching from the left-side of the operator, the system, in one configuration, moves the content of the display to the right of the display while making the left side of the display transparent. In this way, the system improves displaying content when risks are occluded by a vehicle display.

In one embodiment, a system is disclosed. The system includes one or more processors and a memory communicably coupled to the one or more processors. The memory stores a display module including instructions that when executed by the one or more processors cause the one or more processors to, in response to determining a vehicle is operating in an autonomous mode, display content on at least one display within the vehicle that occludes a field-of-view (FOV) of an operator through a window of the vehicle. The memory stores a risk assessment module including instructions that when executed by the one or more processors cause the on or more processors to analyze sensor data from at least one sensor of the vehicle to identify a risk associated with a path of the vehicle. The risk assessment module includes instructions to, in response to determining the risk satisfies a risk threshold, adjust display of the content associated with the display occluding the FOV.

In one embodiment, a non-transitory computer-readable medium including instructions that when executed by one or more processors cause the one or more processors to perform one or more functions is disclosed. The instructions include instructions to, responsive to determining a vehicle is operating in an autonomous mode, display content on at least one display within the vehicle that occludes a field-of-view (FOV) of an operator through a window of the vehicle. The instructions include instructions to analyze sensor data from at least one sensor of the vehicle to identify a risk associated with a path of the vehicle. The instructions include instructions to, responsive to determining the risk satisfies a risk threshold, adjust display of the content associated with the display occluding the FOV.

In one embodiment, a method is disclosed. In one embodiment, the method includes, in response to determining a vehicle is operating in an autonomous mode, displaying content on at least one display within the vehicle that occludes a field-of-view (FOV) of an operator through a window of the vehicle. The method includes analyzing sensor data from at least one sensor of the vehicle to identify a risk associated with a path of the vehicle. The method includes, in response to determining the risk satisfies a risk threshold, adjusting display of the content associated with the display occluding the FOV.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
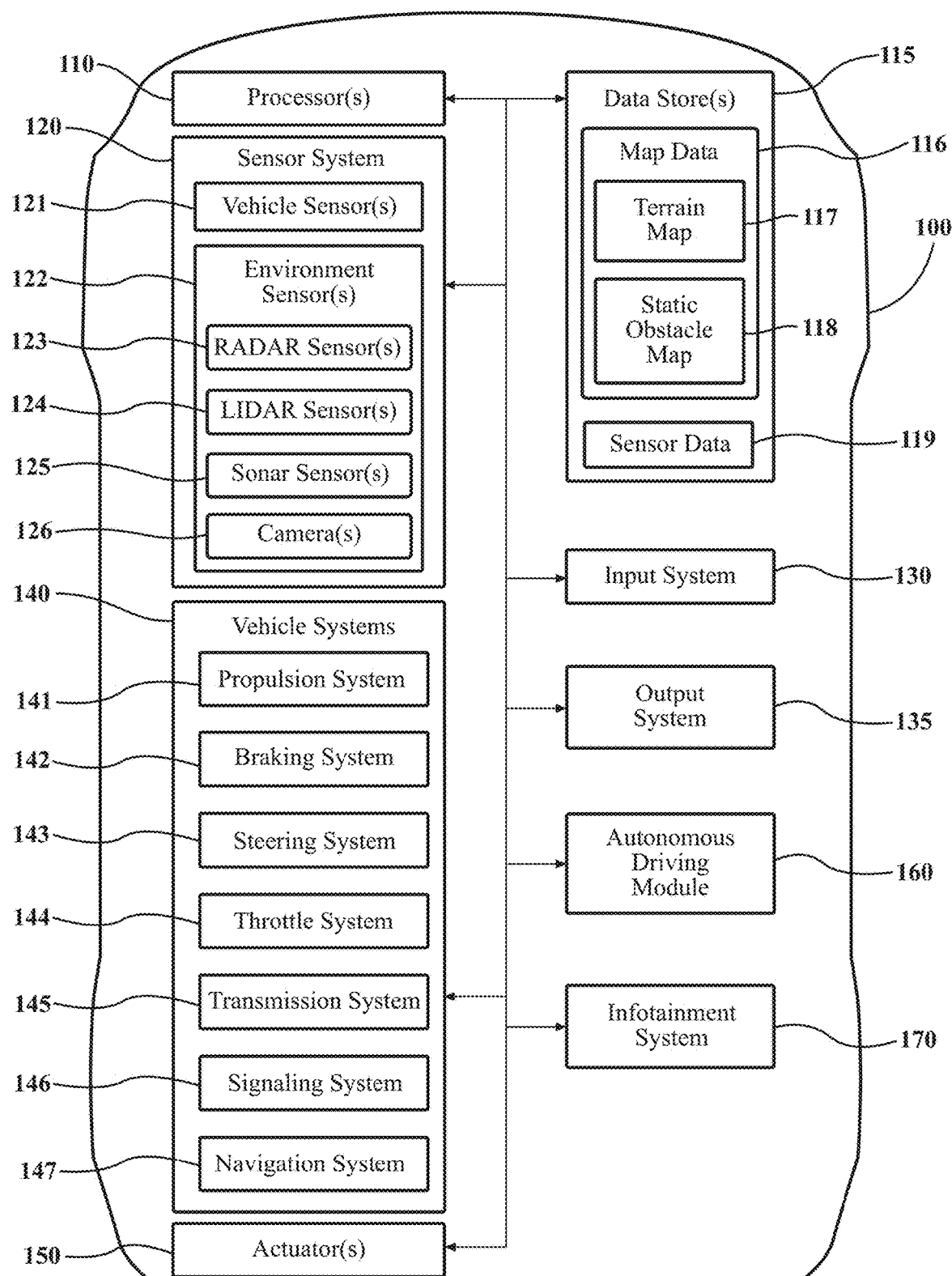
FIG. 1 illustrates one embodiment of a vehicle within which systems and methods disclosed herein may be implemented.

Systems, methods, and other embodiments associated with adjusting a display associated with a vehicle window when risks are identified within the FOV of an operator are disclosed herein. As previously noted, displays associated with a vehicle window present difficulties for autonomous vehicle operators. For example, if a risk, such as a pedestrian, is present in the environment occluded by the display, the vehicle may request manual takeover or make a sudden movement, such as applying the brakes or swerving to avoid the pedestrian. Accordingly, since the operator cannot see the risk the vehicle is seeking to avoid, the operator may become panicked, drive erratically, or think that the vehicle is malfunctioning, which can lead to a collision.

Therefore, in one embodiment, a system is disclosed that adjusts an occluding display associated with a vehicle window when risks are identified within the FOV of an operator. The display may be located on any window of the vehicle. In one arrangement, the display is located on the windshield of the vehicle and occludes the view of the operator. The display displays content in response to the system determining that the vehicle is being operated in an autonomous mode. When the vehicle is being operated in a manual mode, content is not shown on the display, and the display is transparent.

In one approach, the system analyzes sensor data from at least one sensor of the vehicle (e.g., camera, light detection and ranging (LiDAR) sensor, etc.) to identify a risk. The risk may be the presence of one or more pedestrians, the presence of one or more erratic vehicles, a congested road, adverse weather, an upcoming vehicle movement, such as changes in longitudinal and lateral movements due to an upcoming lane change or to avoid hitting an obstacle, a road obstruction, a possible collision, and the like. In one configuration, the system analyzes sensor data to determine a location and trajectory of a risk. For example, the system may analyze sensor data to identify a pedestrian walking towards a trajectory associated with the vehicle. As such, the system determines that a risk is present which causes the system to decide whether to adjust the display occluding the operator's view of the pedestrian. In one configuration, the system adjusts the display when the risk satisfies a risk threshold.

In one embodiment, a risk satisfies the risk threshold when the system determines that the risk is associated with a risk that prompts user action. In one approach, a user action is an operator observation of the surroundings of the vehicle. For example, the system may determine that the vehicle needs to come to a sudden stop if a risk, such as a pedestrian, is present in the path of the vehicle. Since the vehicle will be abruptly applying the brakes, the risk satisfies the risk threshold which causes the system to adjust the display so that the operator can see the risk. In one configuration, user interaction is a manual takeover of the vehicle. For example, the system, in one embodiment, determines that adverse weather, such as snow, rain, sleet, ice, etc., is present in the environment, which prompts the vehicle to request manual takeover. Because the presence of adverse weather prompts manual takeover of the vehicle, the adverse weather satisfies the risk threshold. Accordingly, the system adjusts the display of the content occluding the FOV of the operator.

In one arrangement, the system identifies the gaze of the operator to determine the FOV of the operator. In one approach, the system determines the gaze of the operator by analyzing sensor data associated with sensors located within the vehicle (e.g., a camera) to identify head and eye positions of the operator. In particular, the system analyzes the head and eye positions of the operator to extrapolate a gaze of the operator within the FOV of the operator. The system, in one configuration, determines that a display occludes the risk from the FOV of the operator when the gaze of the operator is directed towards the display, and the risk is occluded by the display. In one arrangement, the system determines the risk is occluded by the display when known or defined areas of view for the operator are directed towards the display, and the risk is occluded by the display. As such, in one embodiment, the system adjusts the display of the content to show the risk within the FOV of the operator.

In one approach, the system adjusts the display of the content by increasing a transparency of the display relative to the FOV of the operator. For example, if a risk that satisfies the risk threshold is present behind the occluding display, the system continues to display content to the operator on the display while increasing the transparency to prompt operator observation of the road or operator takeover of the vehicle.

Additionally, or alternatively, in one arrangement, the system adjusts the display of the content by moving the location of the content relative to the FOV of the operator. The content may be moved horizontally, vertically, resized, moved to a second display of the vehicle, or the like. For example, if the system determines that a vehicle is approaching from the left-side of the operator, the system, in one configuration, moves the content of the display to the right of the display while making the left side of the display transparent. In this way, the system improves displaying content when risks are detected within the FOV of an operator.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any robotic device or form of motorized transport that, for example, includes sensors to perceive aspects of the surrounding environment, and thus benefits from the functionality discussed herein associated with adjusting a display of a vehicle in response to detecting a risk within the environment of the vehicle.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-6 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In either case, the vehicle 100 includes an infotainment system 170 that is implemented to perform methods and other functions as disclosed herein relating to adjusting a vehicle display that occludes a view of an operator in response to identifying a risk.

Figure 2:
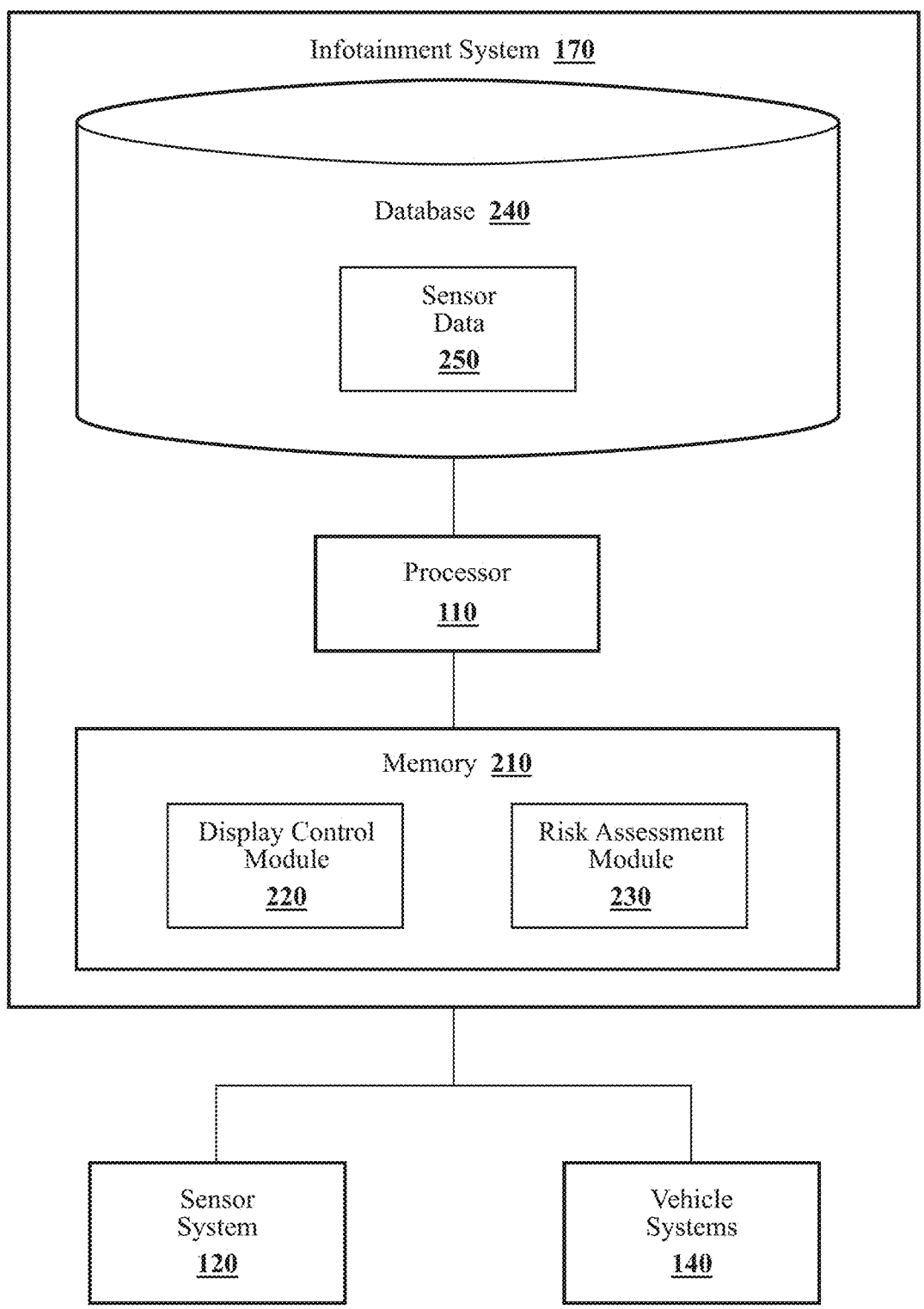
FIG. 2 illustrates one embodiment of an infotainment system that is associated with adjusting a display that occludes a view of an operator.

With reference to FIG. 2, one embodiment of the infotainment system 170 of FIG. 1 is further illustrated. The infotainment system 170 is shown as including a processor 110 from the vehicle 100 of FIG. 1. Accordingly, the processor 110 may be a part of the infotainment system 170, the infotainment system 170 may include a separate processor from the processor 110 of the vehicle 100, or the infotainment system 170 may access the processor 110 through a data bus or another communication path. In one embodiment, the infotainment system 170 includes a memory 210 that stores a display module 220 and a risk assessment module 230. The memory 210 is a random-access memory (RAM), read-only memory (ROM), a hard-disk drive, a flash memory, or other suitable memory for storing the modules 220 and 230. The modules 220 and 230 are, for example, computer-readable instructions that when executed by the processor 110 cause the processor 110 to perform the various functions disclosed herein.

With reference to FIG. 2, the display module 220 generally includes instructions that function to control the processor 110 to display content on a display associated with a window of the vehicle 100. The window is, in one embodiment, the windshield of the vehicle 100. While arrangements will be described herein with respect to a windshield, it will be understood that embodiments are not limited to displaying content on a windshield. In some implementations, the window is a driver-side window, a passenger-side window, or a plurality of windows (i.e., the display spans multiple separate windows). Discussion will now shift to FIG. 3 to further explain how the display module 220 functions when a display associated with the vehicle 100 is in a general state.

Figure 3:
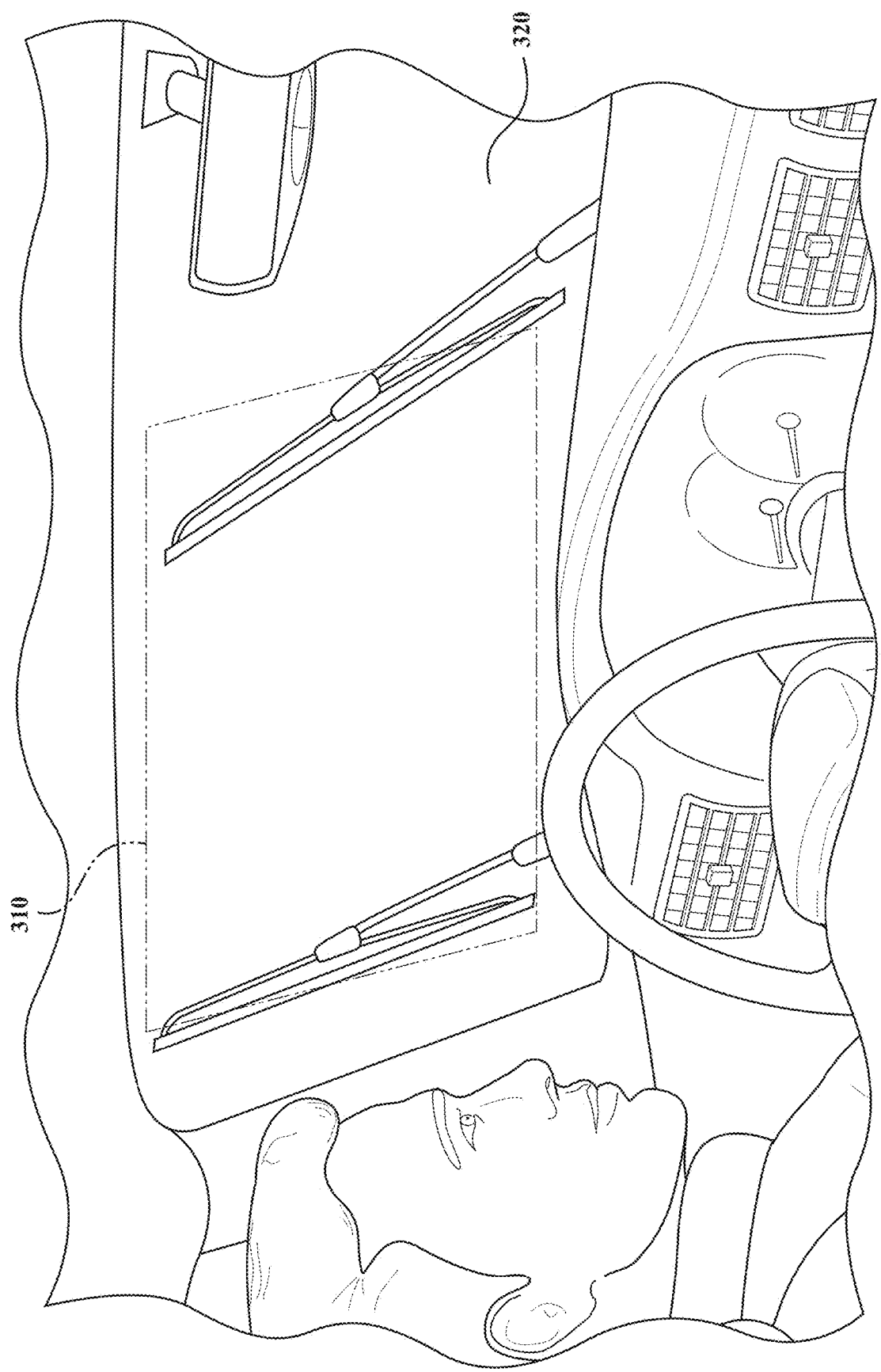
FIG. 3 illustrates one embodiment of a vehicle display operating in a general state is illustrated.

With reference to FIG. 3, one embodiment of a vehicle display 310 operating in a general state is illustrated. In one approach, the display 310 is in a general state when the display 310 is not in use. For example, the display 310 is not in use when the vehicle 100 is in a manual mode. In one configuration the display 310 is integrated within the windshield 320 of the vehicle 100. As illustrated, when the display 310 is in a general state, the display module 220 causes the display 310 to be transparent. In particular, in one arrangement, the display module 220 controls the transparency of the display 310. Accordingly, the display module 220 does not display content on the display 310 when the vehicle is in a manual mode and/or when the display is not otherwise active, thereby remaining transparent as though, for example, the display is seamlessly integrated as part of the window. Discussion will now transition back to FIG. 2 to further explain how the display module 220 functions to display content on the display 310.

In further arrangements, the display module 220 displays content on a display in response to determining that the vehicle 100 is operating in an autonomous mode. In one configuration, the display module 220 determines that the vehicle 100 is operating in an autonomous mode in response to receiving a signal from an input device. The input device is, for example, a human machine interface (HMI), such as a button, switch, touch screen device, or another HMI device that prompts autonomous takeover of the vehicle 100. Discussion will now shift to FIG. 4 to further explain how the display module 220 functions when the vehicle 100 is operating in an autonomous mode.

Figure 4:
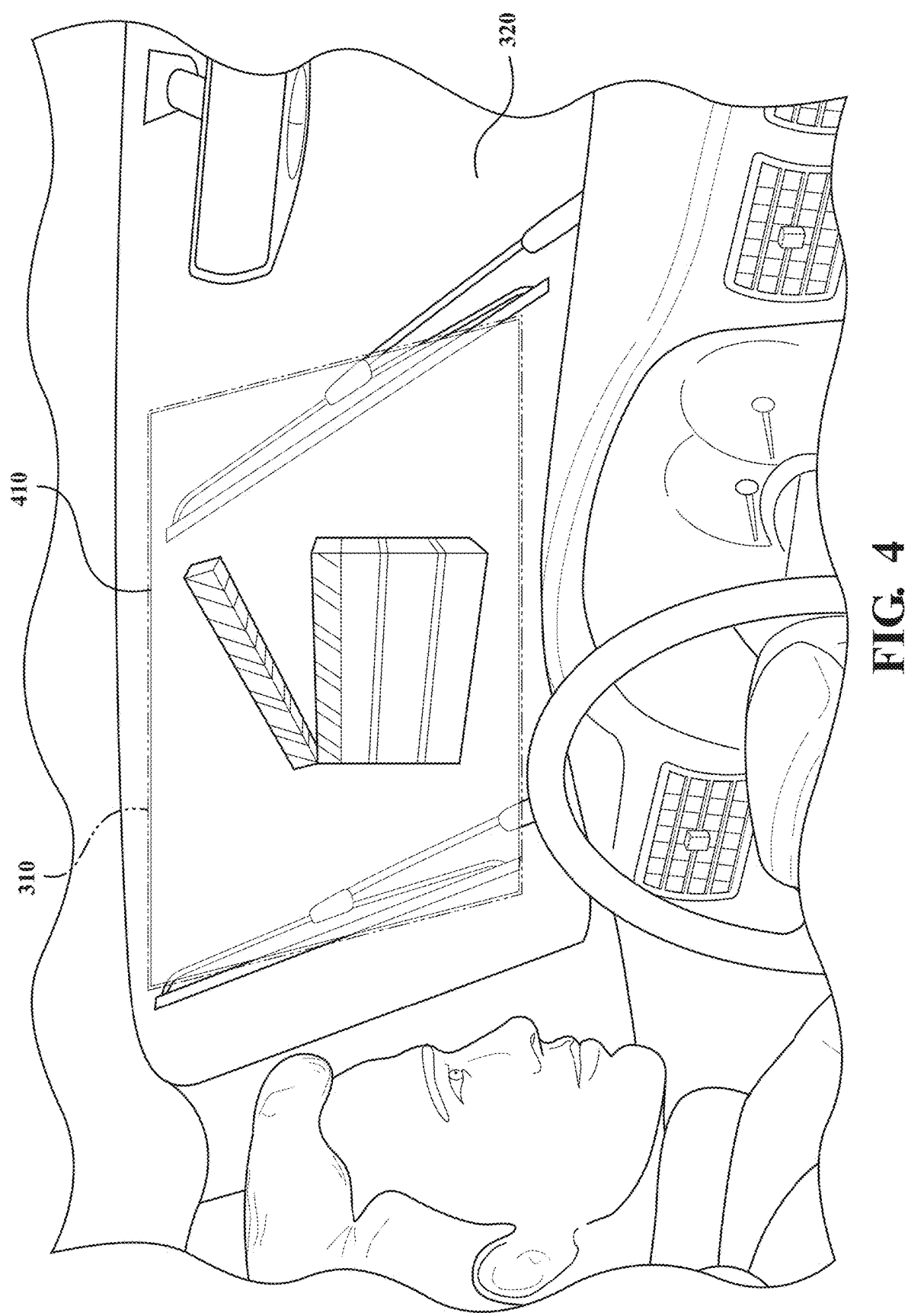
FIG. 4 illustrates one embodiment of a vehicle display that is associated with the vehicle being operated in an autonomous mode.

With reference to FIG. 4, one embodiment of a vehicle display that is associated with the vehicle 100 being operated in an autonomous mode is illustrated. In response to determining the vehicle 100 is operating in an autonomous mode, the display module 220 displays content 410 on the display 310 that is integrated with the windshield 320. The content 410 is, for example, any digital media, such as an advertisement, a television show, navigation instructions, and the like. As illustrated, the display 310, in one arrangement, occludes a FOV of an operator through the windshield 320 of the vehicle 100. Discussion will now transition back to FIG. 2 to further explain how the risk assessment module 230 functions to assess risks in the environment of the vehicle 100 and how the display module 220 adjusts the display 310 in response to the risk assessment module 230 identifying risks within the FOV of an operator.

With reference to FIG. 2, the risk assessment module 230 generally includes instructions that function to control the processor 110 to receive data inputs from one or more sensors of the vehicle 100. The inputs are, in one embodiment, observations of one or more objects in an environment proximate to the vehicle 100 and/or other aspects about the surroundings. As provided for herein, the risk assessment module 230, in one embodiment, acquires sensor data 250 that includes at least camera images. In further arrangements, the risk assessment module 230 acquires the sensor data 250 from further sensors such as a radar 123, a LiDAR 124, and other sensors as may be suitable for identifying vehicles and locations of the vehicles.

Accordingly, the risk assessment module 230, in one embodiment, controls the respective sensors to provide the data inputs in the form of the sensor data 250. Additionally, while the risk assessment module 230 is discussed as controlling the various sensors to provide the sensor data 250, in one or more embodiments, the risk assessment module 230 can employ other techniques to acquire the sensor data 250 that are either active or passive. For example, the risk assessment module 230 may passively sniff the sensor data 250 from a stream of electronic information provided by the various sensors to further components within the vehicle 100. Moreover, the risk assessment module 230 can undertake various approaches to fuse data from multiple sensors when providing the sensor data 250 and/or from sensor data acquired over a wireless communication link. Thus, the sensor data 250, in one embodiment, represents a combination of perceptions acquired from multiple sensors.

In addition to locations of surrounding vehicles, the sensor data 250 may also include, for example, information about objects and trajectories of objects in the vicinity of the vehicle 100, and so on. Moreover, the risk assessment module 230, in one embodiment, controls the sensors to acquire the sensor data 250 about an area that encompasses 360 degrees about the vehicle 100 in order to provide a comprehensive assessment of the surrounding environment. Of course, in alternative embodiments, the risk assessment module 230 may acquire the sensor data about a forward direction alone when, for example, the vehicle 100 is not equipped with further sensors to include additional regions about the vehicle and/or the additional regions are not scanned due to other reasons. In one configuration, the risk assessment module 230 controls the sensors to acquire the sensor data 250 about head and eye positions of an operator of the vehicle 100.

Moreover, in one embodiment, the infotainment system 170 includes a data store 240. In one embodiment, the data store 240 is a database. The database is, in one embodiment, an electronic data structure stored in the memory 210 or another data store and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250 along with, for example, metadata that characterize various aspects of the sensor data 250. In one embodiment, the data store 240 further includes other information that is used by the modules 220 and 230.

The risk assessment module 230, in one embodiment, is further configured to perform additional tasks beyond controlling the respective sensors to acquire and provide the sensor data 250. For example, the risk assessment module 230 includes instructions that cause the processor 110 to analyze the sensor data 250 to identify a risk associated with a path of the vehicle 100. The risk may be, for example, an object located in the path of the vehicle 100, such as, one or more pedestrians, one or more erratic vehicles, one or more animals, one or more road obstructions (e.g., potholes, construction sites, barriers, cones, rocks, etc.), adverse weather (e.g., rain, snow, sleet, ice, etc.), upcoming longitudinal and lateral movements, such as a lane change, a collision, a congested road, or the like. In one arrangement, the risk assessment module 230 analyzes the sensor data 250 to determine a location and trajectory of the risk. For example, the risk assessment module 230 may determine that a pedestrian is present to the left of the operator and on a trajectory towards the path associated with the vehicle 100.

In one approach, the risk assessment module 230 determines whether a risk satisfies a risk threshold. In one configuration, the risk assessment module 230 determines that a risk satisfies the risk threshold by comparing the sensor data 250 associated with the risk to data in the data store 240. In one arrangement, the data in the data store 240 is data (e.g., image and video data) associated with risks that satisfy the risk threshold. If the risk assessment module 230 identifies sensor data 250 that is substantially similar to data in the data store 240 that satisfy the risk threshold, the risk assessment module 230 determines that the risk satisfies the risk threshold. In one embodiment, risks that satisfy the risk threshold are risks that prompt a user action. As such, in one approach, the risk assessment module 230 identifies a risk that prompts a user action.

The user action is, in one arrangement, an observation from the operator or a vehicle takeover maneuver. In one configuration, observation from the operator is prompted when the vehicle 100 abruptly hits the brakes or makes a sudden lateral movement, such as swerving to avoid an obstacle or making a lane change. For example, if a risk in the path of the vehicle 100 is present, and the sensor data 250 associated with that risk is substantially similar to data in the data store 240 associated with a situation that prompts operator observation (e.g., the data in the data store 240 indicates that the vehicle 100 will swerve or brake to avoid the risk), the risk assessment module 230 determines that the risk satisfies the risk threshold. In one embodiment, a vehicle takeover maneuver is prompted when it is safer for an operator to take control of the vehicle 100 than it is for the vehicle 100 to operate in an autonomous mode. For example, if the risk assessment module 230 identifies sensor data 250 of a risk that is substantially similar to data in the data store 240 associated with a situation that prompts a vehicle takeover maneuver (e.g., the data in the data store 240 indicates that the vehicle 100 will request vehicle takeover by an operator due to the presence of this risk), the risk assessment module 230 determines that the risk satisfies the risk threshold.

In response to determining a risk satisfies a risk threshold, the display module 220 adjusts the display of the content 410 associated with the display 310 occluding the FOV. In one approach, the display module 220 adjusts the display of the content 410 in response to the risk assessment module 230 determining that the gaze of the operator is occluded by the display 310. In one embodiment, the risk assessment module 230 analyzes the sensor data 250 to identify at least one of eye positions and head positions of the operator. The risk assessment module 230, in one approach, acquires the sensor data 250 from one or more sensors associated with the interior of the vehicle 100, such as cameras. In one arrangement, the risk assessment module 230 extrapolates the eye and head positions of the operator from the sensor data 250 to determine where the gaze of the operator is directed within the FOV of the operator. Accordingly, the risk assessment module 230 determines that the operator cannot see the risk when the gaze of the operator is directed towards the display 310 that occludes the view of the risk.

In one embodiment, the risk assessment module 230 determines the risk is occluded by the display 310 when known or defined areas of view for the operator are directed towards the display. In one arrangement, the data store 240 stores data relating to the defined areas of view for a particular operator of the vehicle. In one configuration, the risk assessment module 230 detects the operator by extrapolating data about the operator from the sensor data 250. In one approach, the risk assessment module 230 identifies the operator in response to a signal from an input device. For example, the operator may select an operator profile that stores information about the defined areas of view for the particular operator from an HMI, such as a touch screen device, within the vehicle. Based on the operator, the risk assessment module 230 determines that the risk is occluded by the display 310 when the display 310 occludes the defined areas of view for that particular operator.

In one approach, the risk assessment module 230 determines that the risk is occluded by the display 310 by localizing the risk in a three-dimensional space (3D) space (e.g., by using monocular depth estimation) according to the sensor data 250 encompassing the vehicle 100 and the surroundings of the vehicle 100. In one embodiment, the display module 220 adjusts the display of the content 410 to show the risk within the FOV of the operator.

In one approach, the display module 220 adjusts the display of the content 410 to show the risk within the FOV of the operator by increasing a transparency of the display 310 (e.g., by making a section of the display 310 transparent). In one configuration, the display 310 is an organic light emitting diode (OLED) display combined with a liquid crystal display (LCD) dimming panel. The use of an OLED display and LCD dimming panel allows the display module 220 to selectively change the transparency of the display. For example, if a risk, such as an animal is present in the path of the vehicle 100, the display module 220 continues to display content 410 to the operator on the display 310 while increasing the transparency of the display 310. Accordingly, the operator sees the animal behind the display 310 while still viewing the content 410.

The display module 220, in one embodiment, increases the transparency automatically upon the risk assessment module 230 identifying a risk that satisfies the risk threshold. The display module 220, in one arrangement, increases the transparency uniformly across the entire surface of the display 310. In one configuration, the display module 220 increases the transparency of the display 310 only in the part of the display 310 that occludes the risk. In one approach, the display module 220 increases the transparency of the display 310 to a preset degree of transparency (e.g., 25%, 50%, 75%, etc.). In one arrangement, the display module 220 increases the transparency of the display 310 until the risk assessment module 230 identifies that the gaze of the operator is directed towards the risk.

In one approach, the display module 220 adjusts the display of the content 410 to show the risk within the FOV of the operator by moving a location of the content 410 relative to the FOV of the operator. In one embodiment, the display module 220 moves the location of the content 410 laterally or longitudinally. In one configuration, the display module 220 moves the location of the content 410 by resizing a display area. In one arrangement, the display module 220 moves the location of the content 410 to a separate display 310 associated with a different window of the vehicle 100. In any case, the display module 220 moves the content 410 to show the risk within the FOV of the operator. In one approach, the display module 220 displays the content 410 in the adjusted position until the risk assessment module 230 determines that the risk is no longer present. In one arrangement, the risk assessment module 230 determines that the risk is no longer present by analyzing the sensor data 250. Discussion will now shift to FIG. 5 to explain one exemplary embodiment of the display module 220 adjusting the display of the content 410.

Figure 5:
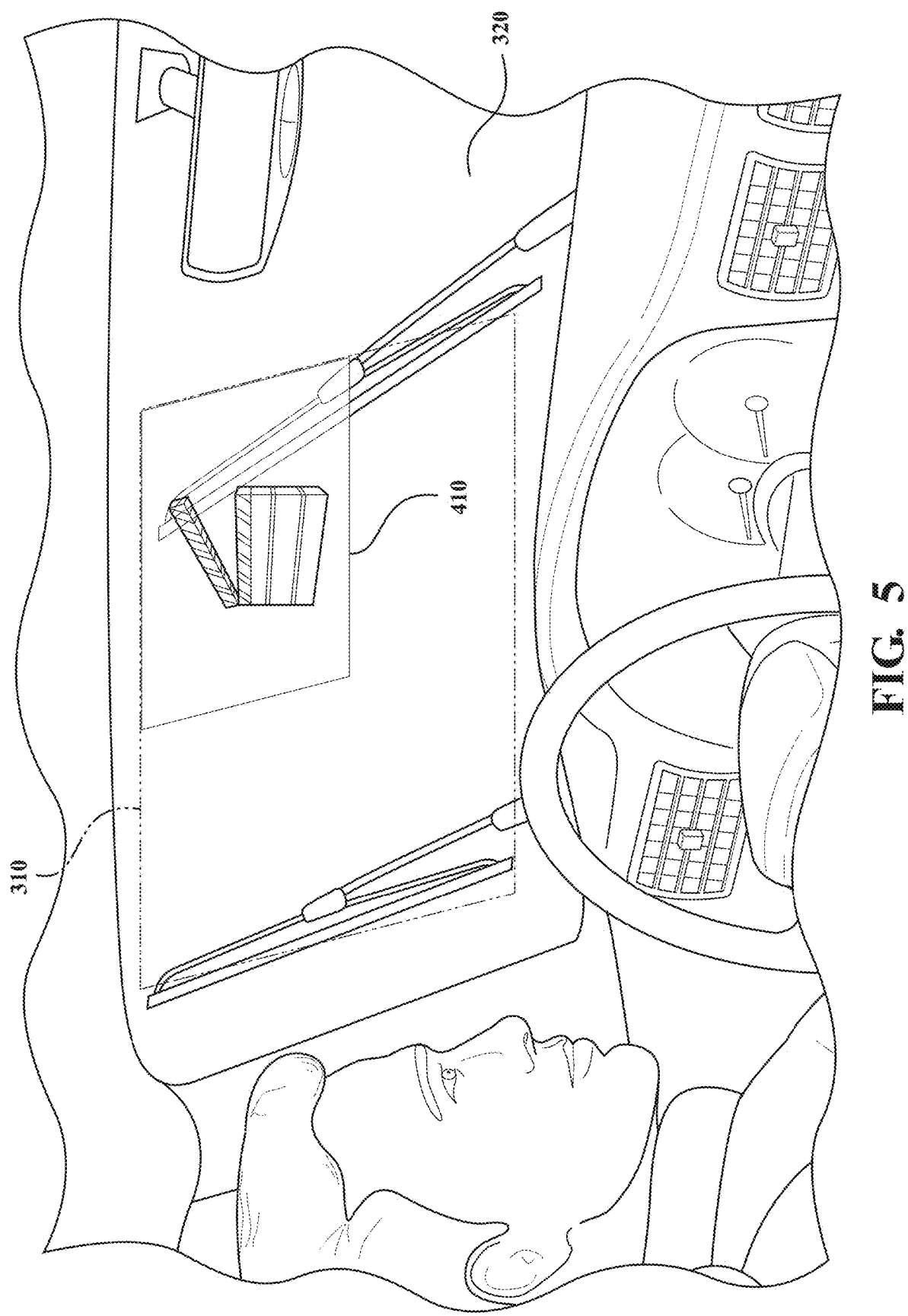
FIG. 5 illustrates one embodiment of a vehicle display that shows content being displayed on the right side of the display in response to detecting a risk.
Figure 6:
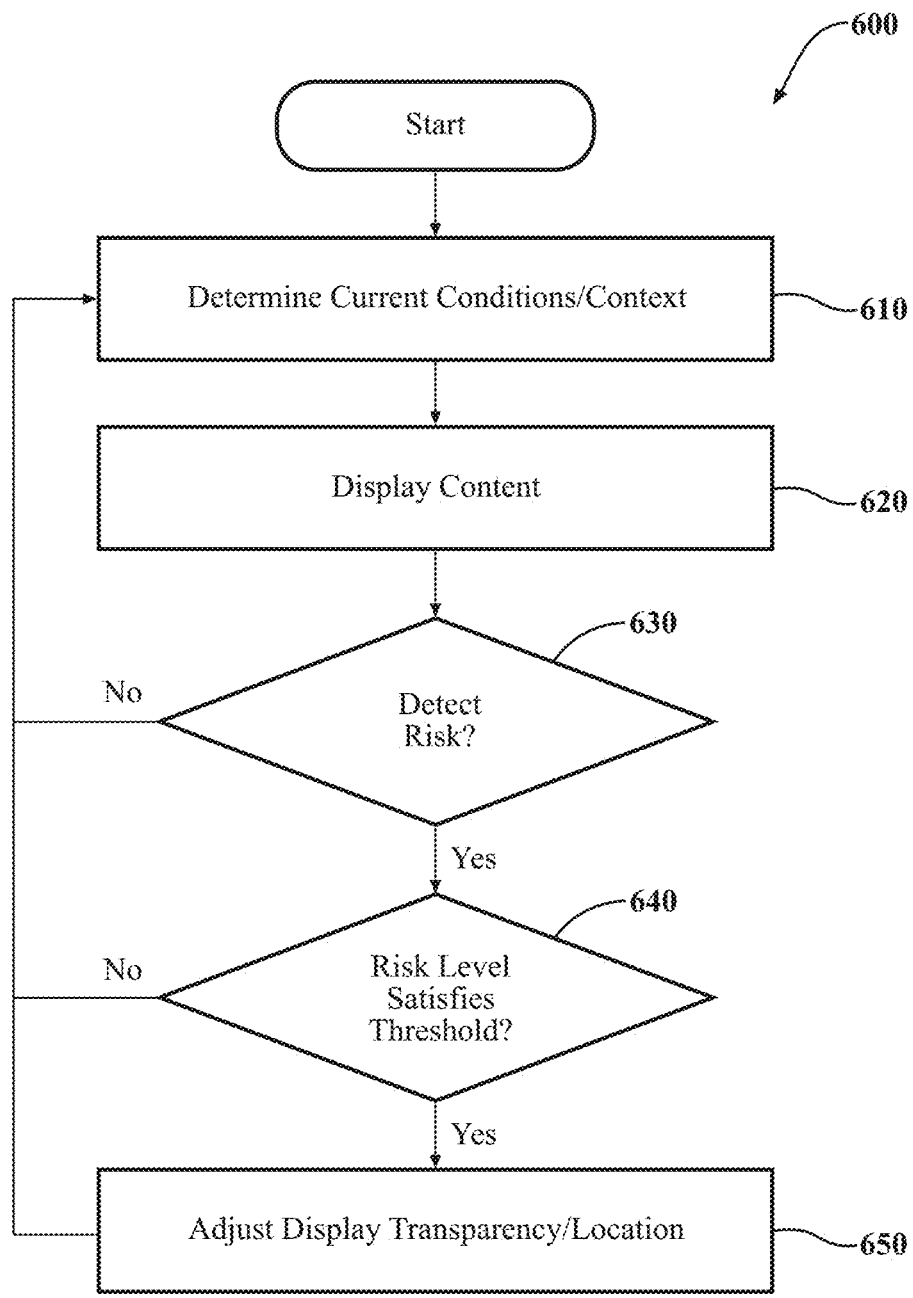
FIG. 6 is a flowchart illustrating one embodiment of a method associated with adjusting a display associated with a vehicle window when risks are identified within the FOV of an operator.

With reference to FIG. 5, one embodiment of the display 310 that shows the content 410 being displayed on the right side of the display 310 in response to the risk assessment module 230 detecting a risk is illustrated. In the exemplary embodiment illustrated in FIG. 5, the risk assessment module 230 detects a risk on the left-side of the vehicle from a view of an operator facing a front windshield of the vehicle 100 that satisfies the risk threshold. Accordingly, the display module 220 resizes (i.e., minimizes) and moves the location of the content 410 to the right-side of the display 310 so that the risk is within the FOV of the operator. As illustrated in FIG. 5, the area of the display 310 that does not display the content 410, remains transparent. In one embodiment, the content 410 remains in the adjusted configuration until the risk assessment module 230 determines that the risk is no longer present.

Additional aspects of adjusting an occluding display in response to identifying risks within the FOV of an operator will be discussed in relation to FIG. 4. FIG. 4 illustrates a flowchart of a method 400 that is associated with adjusting a display associated with a vehicle window when risks are identified within the FOV of an operator. Method 400 will be discussed from the perspective of the infotainment system 170 of FIGS. 1, and 2. While method 400 is discussed in combination with the infotainment system 170, it should be appreciated that the method 400 is not limited to being implemented within the infotainment system 170 but is instead one example of a system that may implement the method 400. Discussion of the method 400 may include discussion of FIGS. 3-5 with respect to how the infotainment system 170 adjusts the content of the display 310 in response to the infotainment system 170 detecting risks.

At 610, the display module 220 determines the current operating condition of the vehicle 100. Specifically, the display module 220 determines whether the vehicle 100 is operating in an autonomous or manual mode. If the vehicle 100 is operating in a manual mode, the display module 220 does not display content 410 on a display 310 associated with the vehicle 100. In one approach, the display module 220 determines that the vehicle 100 is operating in an autonomous mode in response to receiving a signal from an input device, such as a human machine interface (HMI). In one embodiment, the HMI is a button, switch, knob, touch screen device, or the like that an operator engages with to change the operating conditions of the vehicle 100 from manual to autonomous.

At 620, in response to determining the vehicle 100 is operating in an autonomous mode, the display module 220 displays content 410 on at least one display 310 within the vehicle 100 that occludes a FOV of an operator through a window of the vehicle 100. In one approach, the window of the vehicle 100 is the windshield 320. In one embodiment, the content 410 is any digital media, such as, an advertisement, a television show, navigation instructions, and the like. In one configuration, an operator chooses the content 410 that is displayed by entering a control input on an HMI. For example, an operator may select the content 410 from a library on a touch screen device within the vehicle 100.

At 630, the risk assessment module 230 controls the sensor system 120 to acquire the sensor data 250. In one embodiment, the risk assessment module 230 controls the radar sensor 123 and the camera 126 of the vehicle 100 to observe the surrounding environment. Alternatively, or additionally, the risk assessment module 230 controls the camera 126 and the LiDAR 124 or another set of sensors to acquire the sensor data 250. As part of controlling the sensors to acquire the sensor data 250, it is generally understood that the sensors acquire the sensor data 250 of a region around the vehicle 100 with data acquired from different types of sensors generally overlapping in order to provide for a comprehensive sampling of the surrounding environment at each time step. The sensor data 250 of the region around the vehicle 100 could include data related to occupants of the vehicle 100 or data related to the vehicle 100 itself. In general, the sensor data 250 need not be of the exact same bounded region in the surrounding environment but should include a sufficient area of overlap such that distinct aspects of the area can be correlated. Thus, the risk assessment module 230, in one embodiment, controls the sensors to acquire the sensor data 250 of the surrounding environment.

Moreover, in further embodiments, the risk assessment module 230 controls the sensors to acquire the sensor data 250 at successive iterations or time steps. Thus, the infotainment system 170, in one embodiment, iteratively executes the functions discussed at blocks 630-640 to acquire the sensor data 250 and provide information therefrom. Furthermore, the risk assessment module 230, in one embodiment, executes one or more of the noted functions in parallel for separate observations in order to maintain updated perceptions. Additionally, as previously noted, the risk assessment module 230, when acquiring data from multiple sensors, fuses the data together to form the sensor data 250 and to provide for improved determinations of detection, location, and so on.

Accordingly, at step 630, the risk assessment module 230 analyzes the sensor data 250 from at least one sensor of the vehicle 100 to identify a risk associated with a path of the vehicle 100. A risk is, for example, an obstacle or area of avoidance located in the path of the vehicle 100, such as, a presence of at least one pedestrian, a presence of at least one erratic vehicle, a presence of at least one animal, a level of road congestion, a need for changes in longitudinal and lateral movements of the vehicle, at least one road obstruction, a possible collision, or the like. In one arrangement, the risk assessment module 230 determines at least one of a location and a trajectory of the risk. In one embodiment, the risk assessment module 230 determines whether a risk is static (e.g., a road barrier) or dynamic (e.g., a pedestrian walking). For example, the risk assessment module 230 may determine that a pedestrian is present to the left of the vehicle 100 from the perspective of an operator facing the windshield of the vehicle 100 and walking towards the path of the vehicle 100. If a risk is detected, the risk assessment module determines whether the risk satisfies a risk threshold as discussed at block 640. Otherwise, the display module 220 determines the current condition of the vehicle 100 as discussed at block 610.

At 640, in response to determining the risk satisfies a risk threshold, the display module 220 adjusts the display of the content 410 associated with the display 310 occluding the FOV of the operator. In one configuration, the risk assessment module 230 determines that a risk satisfies the risk threshold by comparing the sensor data 250 associated with the risk to data in the data store 240. In one arrangement, the data in the data store 240 is data associated with risks that satisfy the risk threshold. In one embodiment, the data in the data store 240 includes image data and video data of risks that satisfy the risk threshold. If the risk assessment module 230 identifies sensor data 250 that is substantially similar to data in the data store 240 (i.e., the risk resembles image and video data in the data store 240) that satisfy the risk threshold, the risk assessment module 230 determines that the risk satisfies the risk threshold. In one embodiment, risks that satisfy the risk threshold are risks that prompt a user action. As such, in one approach, determining that a risk satisfies the risk threshold includes the risk assessment module 230 identifying a risk that prompts a user action. In one arrangement, the user action includes at least observation from the operator and a vehicle takeover maneuver.

In one configuration, observation from the operator is prompted when the vehicle 100 needs to abruptly hit the brakes or make a sudden lateral movement, such as swerving to avoid an obstacle or making a lane change. For example, if the risk assessment module 230 determines that the risk is a road obstruction, such as a pothole in the path of the vehicle 100, is substantially similar to data in the data store 240 (e.g., image or video data of a pothole) associated with the vehicle 100 swerving to avoid the risk, the risk assessment module 230 determines that the risk (i.e., the pothole) satisfies the risk threshold. As such, the display module 220 adjusts the display of the content 410 to prompt operator observation of the risk that causes the vehicle 100 to swerve. In another example, if the risk assessment module 230 identifies a risk, such as a pedestrian running toward the path of the vehicle 100, and the risk is substantially similar to data in the data store (e.g., image or video data of a pedestrian running towards the vehicle 100) associated with the vehicle 100 braking to avoid hitting the risk, the risk assessment module 230 determines that the risk satisfies the risk threshold. Accordingly, the display module 220 adjusts the display of the content 410 to prompt operator observation of the risk that causes the vehicle 100 to brake.

In one embodiment, a risk prompts a vehicle takeover maneuver when it is safer for an operator to control the vehicle than it is for the vehicle 100 to operate in an autonomous mode. For example, if the risk assessment module 230 identifies a risk, such as an upcoming area of congested traffic, that is substantially similar to data in the data store 240 (e.g., image or video data of congested traffic) associated with the vehicle 100 requesting vehicle takeover by an operator of the vehicle 100, the risk assessment module 230 determines that the risk satisfies the risk threshold. If the risk satisfies the risk threshold, the display module 220 adjusts the display 310 as discussed at block 650. Otherwise, the display module 220 determines the current condition of the vehicle 100 as discussed at block 610.

At 650, in response to determining the risk satisfies the risk threshold, the display module 220 adjusts the display of the content 410 associated with the display 310 occluding the FOV. In one arrangement, the risk assessment module 230 determines that the display 310 occludes the risk by analyzing the gaze of the operator relative to the risk. In one embodiment, the risk assessment module 230 analyzes the sensor data 250 to identify at least one of eye positions and head positions of the operator. The risk assessment module 230, in one approach, acquires the sensor data 250 from one or more sensors (e.g., cameras, LiDARs, and the like) associated with the vehicle 100. In one arrangement, the risk assessment module 230 extrapolates the eye and head positions of the operator from the sensor data 250 to determine where the gaze of the operator is directed within the FOV of the operator. Accordingly, the risk assessment module 230 determines that the risk is occluded by the display 310 when the gaze of the operator is directed towards the display 310.

Alternatively, the risk assessment module 230, in one embodiment, determines the risk is occluded by the display 310 when known or defined areas of view for the operator are directed towards the display 310. In one arrangement, the data store 240 stores data relating to the defined areas of view for a particular operator of the vehicle. In one configuration, the risk assessment module 230 detects the operator by extrapolating biometric data about the operator from the sensor data 250. For example, the risk assessment module 230, in one embodiment, analyzes the sensor data 250 to extrapolate images of the operator. As such, the risk assessment module 230 matches a profile of the operator relating to the defined areas of view of the operator to detected operator to determine which areas the display 310 occludes for the operator. In one approach, the risk assessment module 230 identifies the operator in response to a signal from an input device. For example, the operator may select an operator profile that stores information about the defined areas of view for the particular operator from an HMI, such as a touch screen device, within the vehicle. Based on the operator, the risk assessment module 230 determines that the risk is occluded by the display 310 when the display 310 occludes the defined areas of view that encompass the risk for that particular operator.

In one approach, the risk assessment module 230 determines that the risk is occluded by the display 310 by localizing the risk in a three-dimensional space (3D) space according to the sensor data 250 encompassing the vehicle 100 and the surroundings of the vehicle 100. The localization of the risk may be accomplished through various localization methods, such as, using monocular depth estimation to derive 3D structures of static and dynamic objects in the surrounding environment of the vehicle 100. Accordingly, in one embodiment, the risk assessment module 230 uses the localization of the risk to determine that the risk is occluded by the display 310. In one embodiment, the display module 220 adjusts the display of the content 410 to show the risk within the FOV of the operator.

In one approach, the display module 220 adjusts the display of the content 410 to show the risk within the FOV of the operator by increasing a transparency of the display 310 relative to the FOV of the operator. In one configuration, the display 310 is an OLED display combined an LCD dimming panel, which allows the display module 220 to selectively change the transparency of the display. For example, if a risk, such as an animal is present in the path of the vehicle 100, the display module 220 continues to display content 410 to the operator on the display 310 while increasing the transparency of the display 310. Accordingly, the operator may observe the animal while still viewing the content 410 on the display 310.

The display module 220, in one embodiment, increases the transparency automatically upon the risk assessment module 230 identifying a risk that satisfies the risk threshold. The display module 220, in one arrangement, increases the transparency uniformly across the entire surface of the display 310. In one configuration, the display module 220 increases the transparency of the display 310 only in the part of the display 310 that occludes the risk. For example, if an animal is present in the path of the vehicle 100, the display module 220 increases the transparency of the display 310 only in the area of the display 310 that occludes the animal. In one approach, the display module 220 increases the transparency of the display 310 to a preset degree of transparency. For example, the display module 220 increases the display 310 by 25%, 50%, 75%, etc. In one arrangement, the display module 220 increases the transparency of the display 310 until the risk assessment module 230 identifies that the gaze of the operator is directed towards the risk. For example, the risk assessment module 230 extrapolates head and eye positions of the operator from the sensor data 250 to determine that the gaze of the operator is directed towards the risk. Accordingly, when the gaze of the operator is directed towards the risk, the display module 220 stops increasing the transparency of the display 310.

In one approach, the display module 220 adjusts the display of the content 410 to show the risk within the FOV of the operator by moving a location of the content 410 relative to the FOV of the operator. In one embodiment, the display module 220 moves the location of the content 410 laterally or longitudinally. For example, if the risk module 230 determines that the risk is on the left side of the vehicle 100, the display module 220 moves the content of the display to the right of the display 310 to a location that allows the operator to see the risk. In one configuration, the display module 220 moves the location of the content 410 by resizing (e g, minimizing) the content 410. For example, if the risk is large, such as a car accident, and occluded by a majority of the display 310, the display module 220 minimizes the content 410 until the entirety of the risk can be seen by the operator. In one approach, the display module 220 moves the location of the content 410 to a separate window of the vehicle 100. For example, the display module 220 may move the content of the display 410 from the windshield 320 to a passenger-side window to allow the operator to see everything that is occluded by the display 310 of the windshield 320.

In any case, the display module 220 moves the content 410 to show the risk within the FOV of the operator. In one approach, the display module 220 displays the content 410 in the adjusted position until the risk assessment module 230 determines that the risk is no longer present. In one arrangement, the risk assessment module 230 determines that the risk is no longer present by analyzing the sensor data 250. When the risk is no longer present, the display module 220 displays the content 410 on the entire surface area of the display 310. In this way, the infotainment system 170 adjusts the display of content 410 in response to detecting a risk within the FOV of an operator to improve operator awareness of risks within the environment of the vehicle 100.

FIG. 1 will now be discussed in full detail as an example environment within which the system and methods disclosed herein may operate. In some instances, the vehicle 100 is configured to switch selectively between different modes of operation/control according to the direction of one or more modules/systems of the vehicle 100. In one approach, the modes include: 0, no automation; 1, driver assistance; 2, partial automation; 3, conditional automation; 4, high automation; and 5, full automation. In one or more arrangements, the vehicle 100 can be configured to operate in only a subset of possible modes.

In one or more embodiments, the vehicle 100 is an autonomous vehicle. As used herein, "autonomous vehicle" refers to a vehicle that is capable of operating in an autonomous mode (e.g., category 5, full automation). "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU), and application specific integrated circuit (ASIC), a microprocessor, etc. The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, and hard drives. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry.

In one or more arrangements, the map data 116 can include one or more terrain maps 117. The terrain map(s) 117 can include information about the terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles can include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information about one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means a device that can detect, and/or sense something. In at least one embodiment, the one or more sensors detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors may function independently or two or more of the sensors may function in combination. The sensor system 120 and/or the one or more sensors can be operatively connected to the processor(s) 110, the data store(s) 115, and/or another element of the vehicle 100. The sensor system 120 can produce observations about a portion of the environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect information about the vehicle 100 itself. In one or more arrangements, the vehicle sensor(s) 121 can be configured to detect position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect one or more characteristics of the vehicle 100 and/or a manner in which the vehicle 100 is operating. In one or more arrangements, the vehicle sensor(s) 121 can include a speedometer to determine a current speed of the vehicle 100.

Alternatively, or in addition, the sensor system 120 can include one or more environment sensors 122 configured to acquire data about an environment surrounding the vehicle 100 in which the vehicle 100 is operating. "Surrounding environment data" includes data about the external environment in which the vehicle is located or one or more portions thereof. For example, the one or more environment sensors 122 can be configured to sense obstacles in at least a portion of the external environment of the vehicle 100 and/or data about such obstacles. Such obstacles may be stationary objects and/or dynamic objects. The one or more environment sensors 122 can be configured to detect other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more of each of the following: radar sensors 123, LIDAR sensors 124, sonar sensors 125, weather sensors, haptic sensors, locational sensors, and/or one or more cameras 126. In one or more arrangements, the one or more cameras 126 can be high dynamic range (HDR) cameras, stereo or infrared (IR) cameras.

The vehicle 100 can include an input system 130. An "input system" includes components or arrangement or groups thereof that enable various entities to enter data into a machine. The input system 130 can receive an input from a vehicle occupant. The vehicle 100 can include an output system 135. An "output system" includes one or more components that facilitate presenting data to a vehicle occupant.

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the infotainment system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement of the vehicle 100. The processor(s) 110, the infotainment system 170, and/or autonomous driving module(s) 160 may control some or all of the vehicle systems 140 and, thus, may be partially or fully autonomous as defined by SAE 0 to 5.

The processor(s) 110, the infotainment system 170, and/or the autonomous driving module(s) 160 can be operatively connected to communicate with the various vehicle systems 140 and/or individual components thereof. For example, returning to FIG. 1, the processor(s) 110, the infotainment system 170, and/or the autonomous driving module(s) 160 can be in communication to send and/or receive information from the various vehicle systems 140 to control the movement. of the vehicle 100. The processor(s) 110, the infotainment system 170, and/or the autonomous driving module(s) 160 may control some or all of the vehicle systems 140.

The processor(s) 110, the infotainment system 170, and/or the autonomous driving module(s) 160 may be operable to control the navigation and maneuvering of the vehicle 100 by controlling one or more of the vehicle systems 140 and/or components thereof. For instance, when operating in an autonomous mode, the processor(s) 110, the infotainment system 170, and/or the autonomous driving module(s) 160 can control the direction and/or speed of the vehicle 100. The processor(s) 110, the infotainment system 170, and/or the autonomous driving module(s) 160 can cause the vehicle 100 to accelerate, decelerate, and/or change direction. As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be element or combination of elements operable to alter one or more of the vehicle systems 140 or components thereof to responsive to receiving signals or other inputs from the processor(s) 110 and/or the autonomous driving module(s) 160. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the infotainment system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data 250 as implemented by the occupancy module 230. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system, comprising:
one or more processors; and
a memory communicably coupled to the one or more processors and storing instructions that, when executed by the one or more processors, cause the one or more processors to:
in response to determining a vehicle is operating in an autonomous mode, display content on at least one display within the vehicle that occludes a field-of-view (FOV) of an operator through a window of the vehicle;
analyze sensor data from at least one sensor of the vehicle to identify a risk associated with a path of the vehicle; and
in response to determining the risk satisfies a risk threshold, adjust display of the content associated with the display occluding the FOV by moving a location of the content relative to the FOV of the operator.

2. The system of claim 1, wherein the instructions to adjust the display of the content include instructions to analyze the sensor data from at least one sensor of the vehicle to identify at least one of eye positions and head positions of the operator;
determine the display of the content occludes the risk from the FOV of the operator, wherein the FOV of the operator depends, at least in part, on the at least one of the eye positions and the head positions of the operator; and
adjust the display of the content to show the risk within the FOV of the operator.

3. The system of claim 1, wherein the instructions to adjust the display of the content include instructions to increase a transparency of the display relative to the FOV of the operator.

4. The system of claim 1, wherein the instructions to adjust the display of the content include instructions to locally adapt a transparency of a portion of the display relative to the FOV.

5. The system of claim 1, wherein the instructions to determine whether the risk satisfies the risk threshold includes instructions to identify a risk that prompts a user action, wherein the user action includes at least observation from the operator and a vehicle takeover maneuver.

6. The system of claim 1, wherein the instructions to analyze the sensor data include instructions to identify at least one of: a presence of at least one pedestrian, a presence of at least one erratic vehicle, a presence of at least one animal, a level of road congestion, a need for changes in longitudinal and lateral movements of the vehicle, a presence of at least one road obstruction, and a possible collision.

7. The system of claim 1, wherein the instructions to analyze the sensor data include instructions to determine at least one of: a location and a trajectory of the risk.

8. The system of claim 1, wherein the window of the vehicle is a windshield.

9. A non-transitory computer-readable medium for including instructions that when executed by one or more processors cause the one or more processors to:
responsive to determining a vehicle is operating in an autonomous mode, display content on at least one display within the vehicle that occludes a field-of-view (FOV) of an operator through a window of the vehicle;
analyze sensor data from at least one sensor of the vehicle to identify a risk associated with a path of the vehicle; and
responsive to determining the risk satisfies a risk threshold, adjust display of the content associated with the display occluding the FOV by moving a location of the content relative to the FOV of the operator.

10. The non-transitory computer-readable medium of claim 9, wherein the instructions to adjust the display of the content include instructions to:
analyze the sensor data from at least one sensor of the vehicle to identify at least one of eye positions and head positions of the operator;
determine the display of the content occludes the risk from the FOV of the operator, wherein the FOV of the operator depends, at least in part, on the at least one of the eye positions and the head positions of the operator; and
adjust the display of the content to show the risk within the FOV of the operator.

11. The non-transitory computer-readable medium of claim 9, wherein the instructions to adjust the display of the content include instructions to increase a transparency of the display relative to the FOV of the operator.

12. The non-transitory computer-readable medium of claim 9, wherein the instructions to adjust the display of the content include instructions to locally adapt a transparency of a portion of the display relative to the FOV.

13. The non-transitory computer-readable medium of claim 9, wherein the instructions to determine the risk satisfies the risk threshold include instructions to identify a risk that prompts a user action, wherein the user action includes at least observation from the operator and a vehicle takeover maneuver.

14. A method, comprising:
in response to determining a vehicle is operating in an autonomous mode, displaying content on at least one display within the vehicle that occludes a field-of-view (FOV) of an operator through a window of the vehicle;
analyzing sensor data from at least one sensor of the vehicle to identify a risk associated with a path of the vehicle; and
in response to determining the risk satisfies a risk threshold, adjusting display of the content associated with the display occluding the FOV, including moving a location of the content relative to the FOV of the operator.

15. The method of claim 14, wherein adjusting the display of the content includes:
analyzing the sensor data from at least one sensor of the vehicle to identify at least one of eye positions and head positions of the operator;
determining the display of the content occludes the risk from the FOV of the operator, wherein the FOV of the operator depends, at least in part, on the at least one of the eye positions and the head positions of the operator; and
adjusting the display of the content to show the risk within the FOV of the operator.

16. The method of claim 14, wherein adjusting the display of the content includes increasing a transparency of the display relative to the FOV of the operator.

17. The method of claim 14, wherein adjusting the display of the content includes locally adapting a transparency of a portion of the display relative to the FOV.

18. The method of claim 14, wherein determining the risk satisfies the risk threshold includes identifying a risk that prompts a user action, wherein the user action includes at least observation from the operator and a vehicle takeover maneuver.

19. The method of claim 14, wherein analyzing the sensor data includes identifying at least one of: a presence of at least one pedestrian, a presence of at least one erratic vehicle, a presence of at least one animal, a level of road congestion, a need for changes in longitudinal and lateral movements of the vehicle, a presence of at least one road obstruction, and a possible collision.

20. The method of claim 14, wherein analyzing the sensor data includes determining at least one of: a location and a trajectory of the risk.

* * * * *